(12) United States Patent
Huang et al.

(10) Patent No.: US 9,558,096 B2
(45) Date of Patent: Jan. 31, 2017

(54) METHOD AND APPARATUS FOR SUPPORTING PERFORMANCE ANALYSIS

(71) Applicant: MARVELL WORLD TRADE LTD, St. Michael (BB)

(72) Inventors: Haitao Huang, Shanghai (CN); Liping Gao, Shanghai (CN); Ningsheng Jian, Shanghai (CN); Xinyu Qi, Shanghai (CN); XingXing Pan, Shanghai (CN); Pengfei Li, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/657,770

(22) Filed: Mar. 13, 2015

(65) Prior Publication Data

US 2015/0269052 A1     Sep. 24, 2015

Related U.S. Application Data

(60) Provisional application No. 61/968,707, filed on Mar. 21, 2014.

(51) Int. Cl.
*G06F 9/45* (2006.01)
*G06F 11/34* (2006.01)
*G06F 11/36* (2006.01)
*G06F 9/44* (2006.01)

(52) U.S. Cl.
CPC ............ *G06F 11/3409* (2013.01); *G06F 8/41* (2013.01); *G06F 11/3466* (2013.01); *G06F 11/36* (2013.01); *G06F 11/3428* (2013.01); *G06F 2201/865* (2013.01)

(58) Field of Classification Search
None
See application file for complete search history.

(56) References Cited

U.S. PATENT DOCUMENTS

| 6,295,643 | B1 * | 9/2001 | Brown | G06F 9/4428 |
| | | | | 714/E11.212 |
| 6,658,652 | B1 * | 12/2003 | Alexander, III | G06F 9/5016 |
| | | | | 707/999.202 |
| 6,678,883 | B1 * | 1/2004 | Berry | G06F 11/3636 |
| | | | | 714/45 |
| 6,988,263 | B1 * | 1/2006 | Hussain | G06F 11/323 |
| | | | | 714/E11.181 |
| 8,510,725 | B2 * | 8/2013 | Frost | G06F 9/44552 |
| | | | | 717/139 |

(Continued)

OTHER PUBLICATIONS

Marko Vitas, "ART vs Dalvik—introducing the new Android runtime in KitKat", Published in Technology, Learning, Android development • Dec. 4th, 2013, Located at: https://infinum.co/the-capsized-eight/articles/art-vs-dalvik-introducing-the-new-android-runtime-in-kit-kat.*

(Continued)

*Primary Examiner* — Wei Zhen
*Assistant Examiner* — Hossain Morshed

(57) ABSTRACT

Aspects of the disclosure provide a method to support performance analysis. The method includes compiling bytecodes to generate native codes corresponding to the bytecodes in an electronic device, generating a file to include the bytecodes and the corresponding native codes in the file, collecting symbol information to map symbols in the bytecodes with offsets of corresponding native codes, and including the symbol information in the file to enable profiling.

20 Claims, 4 Drawing Sheets

(56) References Cited

U.S. PATENT DOCUMENTS

| | | | |
|---|---|---|---|
| 2002/0147969 A1* | 10/2002 | Lethin | G06F 9/45504 717/138 |
| 2005/0028155 A1* | 2/2005 | Jung | G06F 8/52 718/1 |
| 2006/0230034 A1* | 10/2006 | Balmelli | G06Q 10/10 |
| 2008/0172662 A1* | 7/2008 | Harris | G06F 8/443 717/159 |
| 2013/0346952 A1* | 12/2013 | Huang | G06F 8/443 717/148 |

OTHER PUBLICATIONS

Suyash Srijan, "What are the technical details of the Android ART runtime introduced in Android 4.4?" Nov. 2013 Located at: https://www.quora.com/What-are-the-technical-details-of-the-Android-ART-runtime-introduced-in-Android-4-4 Nov. 2013.*

Tool Interface Standards (TIS), "Executable and Linkable Format (ELF)" Located at: http://flint.cs.yale.edu/cs422/doc/ELF_Format.pdf Image captured on Jul. 2011.*

Internet archive—"Executable and Linkable Format (ELF)"—Capture date—2015.*

KitKat Release Date—Google Search, Date: 2015.*

Sabanal-Exploring-the-new-Android-Kitkat-Runtime, presentation title State of the ART, Exploring the new Android Kitkat runtime, Published by IBM X-Force Advanced Research, 2014.*

Android Studio-Investigating RAM usage—2013, Android Developer, Article title: Investigating Your RAM Usage | Android Studio—Android Developers, published in 2013 at https://developer.android.com/studio/profile/investigate-ram.html.*

Android (operating system), https://en.wikipedia.org/wiki/Android_(operating_system), Wikipedia page last modified on Feb. 8, 2016, 34 pages.

Android version history, https://en.wikipedia.org/wiki/Android_version_history#Android_4.4.E2.80.934.4.4KitKat_.28API_level_19.29, Wikipedia page last modified on Feb. 8, 2016, 36 pages.

Android Runtime, https://en.wikipedia.org/wiki/Android_Runtime, Wikipedia page last modified on Jan. 16, 2016, 3 pages.

Dalvik (software), https://en.wikipedia.org/wiki/Dalvik_(software), Wikipedia page last modified on Jan. 18, 2016, 5 pages.

Dalvik Executable format, https://source.android.com/devices/tech/dalvik/dex-format.html, publication date unknown, 22 pages.

Configuring ART, https://source.android.com/devices/tech/dalvik/configure.html, publication date unknown, 6 pages.

* cited by examiner

METHOD AND APPARATUS FOR SUPPORTING PERFORMANCE ANALYSIS

INCORPORATION BY REFERENCE

This present disclosure claims the benefit of U.S. Provisional Application No. 61/968,707, "Extended OAT File Format Used for Supporting Performance Analysis" filed on Mar. 21, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, profiling tools can be used to conduct performance analysis in a computer system. In an example, a computer system is periodically interrupted, and a profiling tool samples various parameters in the computer system during interrupt routines. The sampled data can be collected to profile the computer system, and to statistically analyze the performance of the computer system.

SUMMARY

Aspects of the disclosure provide a method to support performance analysis. The method includes compiling bytecodes to generate native codes corresponding to the bytecodes in an electronic device, generating a file to include the bytecodes and the corresponding native codes in the file, collecting symbol information to map symbols in the bytecodes with offsets of corresponding native codes, and including the symbol information in the file to enable profiling.

Further, in an embodiment, the method includes loading the bytecodes and the native codes from the file to a segment of a memory for execution, sampling a program counter (PC) to obtain a PC address during execution, converting the PC address to an offset to a starting address of the segment, and determining a symbol for the offset according to the symbol information.

In an example, to collect the symbol information to map the symbols in the bytecodes with the offsets of the corresponding native codes, the method includes collecting method information to map methods in the bytecodes with offsets of corresponding native codes for the methods. In another example, the method includes collecting bytecodes information to map bytecodes with offsets of corresponding native codes for the bytecodes. In another example, the method includes including one or more symbols with predefined meanings in the symbol information.

To compile the bytecodes to generate the native codes corresponding to the bytecodes, in an example, the method includes compiling the bytecodes, when the bytecodes are executed for a first time, to generate the native codes corresponding to the bytecodes. In another example, the method includes compiling the bytecodes of an application at an installation time of the application. In another example, the method includes compiling the bytecodes at a boot time of the electronic device. Further, the method includes storing the file, and loading the native codes from the file for subsequently executions.

In an embodiment, to compile the bytecodes to generate the native codes corresponding to the bytecodes in the electronic device, the method includes starting an Android runtime (ART) to compile the bytecodes to generate the native codes corresponding to the bytecodes.

Further, in an example, the method includes generating the file in an executable and linkable format to include the bytecodes and the corresponding native codes in the file. In an embodiment, the method includes including the symbol information in a dynamic symbol section for specifying dynamic linking information.

Aspects of the disclosure provide a non-transitory computer readable medium storing instructions for causing a processor to execute operations. The method includes compiling bytecodes to generate native codes corresponding to the bytecodes in an electronic device, generating a file to include the bytecodes and the corresponding native codes in the file, collecting symbol information to map symbols in the bytecodes with offsets of corresponding native codes, and including the symbol information in the file to enable profiling.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
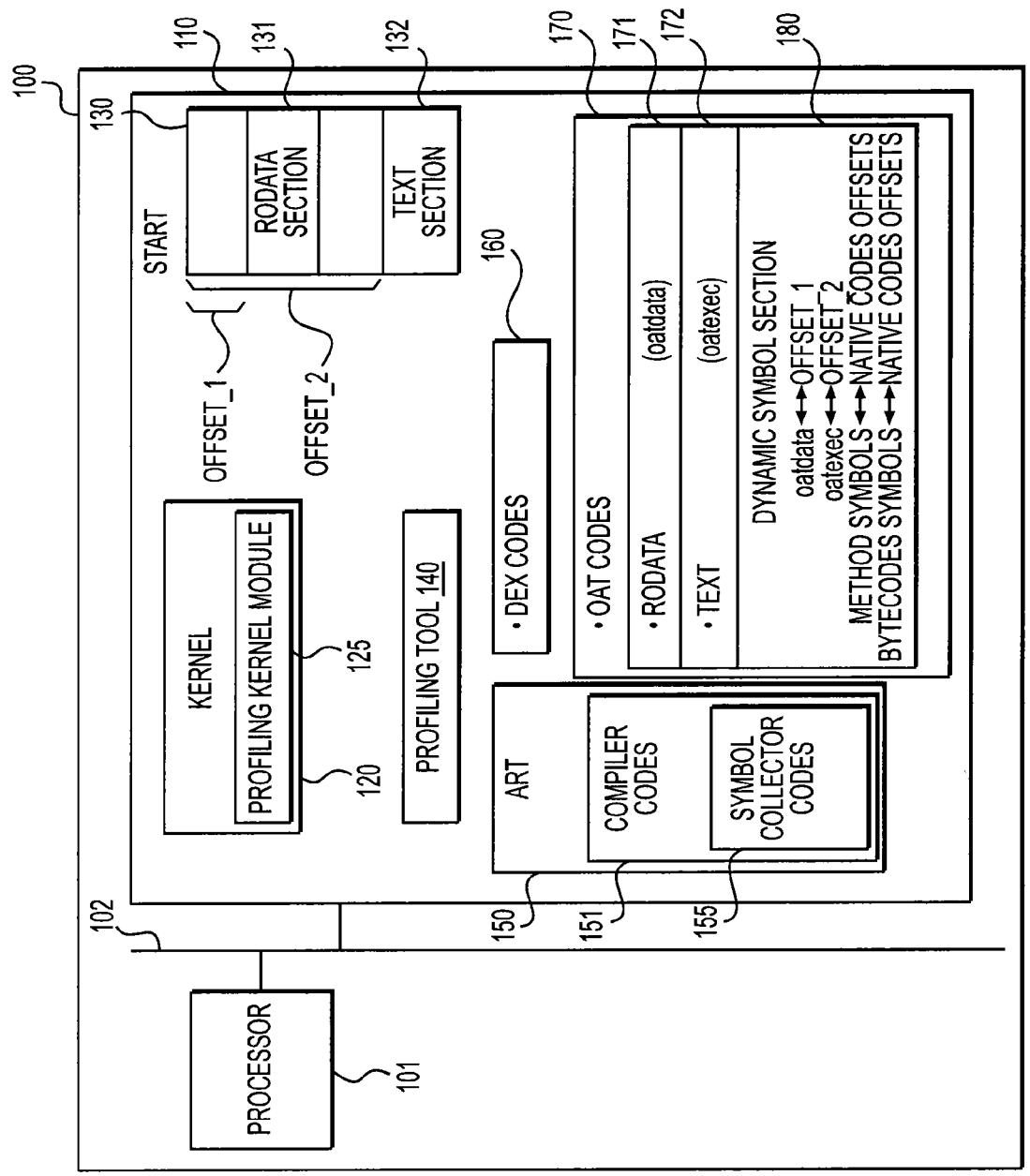
FIG. 1 shows a block diagram of an electronic device 100 according to an embodiment of the disclosure.

FIG. 1 shows a block diagram of an electronic device 100 according to an embodiment of the disclosure. The electronic device 100 is installed with a run time environment software having a compiler 151. The compiler 151 is configured to convert bytecodes to native codes, and collect mapping information between symbols in the bytecodes to the corresponding native codes during compilation to enable performance profiling.

The electronic device 100 can be any suitable device, such as a desktop computer, a laptop computer, a mobile phone, a tablet, a multimedia player, a pocket calculator, a personal digital assistant (PDA), a smart watch, a smart camera and the like that includes a processor 101 to execute software instructions.

The electronic device 100 includes hardware components, such as the processor 101, a memory module 110, a bus 102, and the like, and software components, such as various code instructions stored in the memory module 110. The hardware components operate according to the software components to perform various tasks.

The electronic device 100 can include other suitable components (not shown), such as a display, a touchscreen, a microphone, a communication component, and the like. In an embodiment, the electronic device 100 includes a single integrated circuit (IC) chip that integrates various circuits, such as the processor 101, the memory module 110, and the like on the single IC chip. In another embodiment, the electronic device 100 includes multiple IC chips, such as a processor chip, a memory chip and the like.

The processor 101 includes one or more processing units to execute various code instructions to perform various tasks. In an example, the processor 101 is a multi-core processor, such as a dual-core processor, a quad-core processor, and the like. Further, the processor 101 can have any suitable architecture, such as an x86 architecture, a reduced instruction set computing (RISC) architecture, a complex instruction set computing (CISC) architecture, and the like. In an example, the electronic device 100 is a mobile device having an advanced RISC machine (ARM) type processor.

The code instructions can be low level codes, such as machine codes (native codes), that can be directly executed by the processor 101 or can be high level codes, such as in Java language, in C language and the like, that can be translated to the machine codes and then executed.

The memory module 110 includes one or more storage media that provide memory space for various storage needs. In an example, the memory module 110 stores code instructions to be executed by the processor 101 and stores data to be processed by the processor 101. In another example, the memory module 110 includes memory spaces allocated for system storage, and includes memory spaces allocated for user storage.

The storage media include, but are not limited to, hard disk drive, optical disc, solid state drive, read-only memory (ROM), dynamic random access memory (DRAM), static random access memory (SRAM), flash memory, and the like.

According to an aspect of the disclosure, the memory module 110 stores various computer programs, such as system programs, user application programs, and the like. Each computer program includes code instructions to be executed to perform tasks. In the FIG. 1 example, a memory space 120 is allocated in the memory module 110 to store a kernel program. The kernel program is a part of an operating system for the electronic device 100 that interfaces user application programs with the hardware components of the electronic device 100. For example, the kernel program manages input/output requests from software components, such as the user application programs and the like, and translates them into data processing instructions for the hardware components, such as the processor 101, the memory module 110 and the like.

In the FIG. 1 example, the kernel program includes a profiling kernel module 125. In an example, the profiling kernel module 125 is configured to periodically (e.g., every 50 ms) cause interrupts, and obtain a value in a program counter (PC) register in the processor 101 as a PC address during interrupt routines. In an example, the PC address is the present address of the instruction for execution by the processor 101.

Further, in the FIG. 1 example, a memory space 150 is allocated in the memory module 110 to store a run time environment software that is suitable for the electronic device 100. The run time environment software is installed in the electronic device 100 to provide a Java runtime environment (JRE), such that Java bytecode can be executed in the electronic device 100. In an example, the Java software program is executed to start a Java virtual machine in the electronic device 100 for executing Java bytecode. In an example, the electronic device 100 is an Android system, and the memory space 150 stores Android runtime (ART) software program for the Android system.

In an embodiment, source codes of a user application are generated in Java language. The source codes are compiled to generate Java bytecodes for the user application. The Java bytecodes are executable by various Java virtual machines. In the FIG. 1 example, a memory space 160 is allocated to store Java bytecodes (.dex file) for a user application. To execute the Java bytecodes, the electronic device 100 starts the Java virtual machine. The Java virtual machine provides a Java runtime environment for the Java bytecodes. After the execution of the Java bytecodes, the Java virtual machine is terminated in an example.

According to an aspect of the disclosure, the Java virtual machine ART uses ahead-of-time (AOT) compilation for Java bytecodes execution to improve application performance. The Java virtual machine ART includes the compiler 151 configured to convert Java bytecodes to native codes for the electronic device 100. In an example, when the Java virtual machine ART executes, for a first time, a user application in Java bytecodes, such as the user application stored at the memory space 160, the compiler 151 compiles the user application to convert the Java bytecodes into native codes, generates a file, such as .oat file, and includes the native codes in the .oat file. In the FIG. 1 example, a memory space 170 is allocated to store the .oat file. The native codes in the .oat file are loaded, for example into a memory space 130, and then executed. Further, when the Java virtual machine ART executes the user application again, the stored native codes in the .oat file are accessed and executed. It is noted that the compilation can also happen at an installation time of the user application or at a first boot time of the electronic device 100.

Specifically, in the FIG. 1 example, the .oat file is in an executable and linkable format (ELF). The .oat file includes multiple sections, such as a rodata section 171, a text section 172, a dynamic symbol section 180 and the like. It is noted that the .oat file includes other sections that are not shown in FIG. 1. In an example, the rodata section 171 includes oat data, such as class data, bytecodes for the user application, and the like; the text section 172 includes native codes and auxiliary information; and the dynamic symbol section 180 includes a dynamic linking information.

Generally, the dynamic linking information is used during loading and execution. For example, the dynamic symbol section 180 includes a first mapping of a first symbol "oatdata" to a first offset OFFSET_1, and a second mapping of a second symbol "oatexec" to a second offset OFFSET_2. The first symbol "oatdata" is the symbol for the rodata section 171, and the second symbol "oatexec" is the symbol for the text section 172.

In an example, to execute the user application, a memory segment 130 is allocated to load codes, such as the rodata section 171, the text section 172, and the like, according to the dynamic linking information in the dynamic symbol section 180. In the FIG. 1 example, the memory segment 130 starts at an address shown as START, the rodata section 171 is loaded into the memory segment 130 as a rodata section 131 with the first offset (OFFSET_1) to the START address, and the text section 172 is loaded into the memory segment 130 as a text section 132 with the second offset (OFFSET_2) to the START address. Then, in an example, the native codes in the text section 132 are executed by the processor 101.

In the example, each time to execute the user application, a different memory segment 130 can be allocated to load the codes, such as the rodata section 171 and the text section 172 and the like. Thus, the codes may be loaded into the different memory addresses each time. However, the offsets of memory addresses to the START address of the allocated memory segment 130 are sustained for the executions. In an example, when the processor 101 executes a native code, the PC address is the memory address of the native code, the relationship of the PC address, the offset of the native code and the START address of the memory segment 130 can be represented as shown in Eq. 1:

$$PC\ address = START + offset \qquad \text{Eq. 1}$$

Each time to execute the user application, the START address of the memory segment 130 can be different, the PC address when the native code is under execution can be different, and the offset is the same.

According to an aspect of the disclosure, to facilitate performance profiling, the compiler 151 includes symbol collector codes 155 configured to collect symbol information to map symbols in the bytecodes with offsets of corresponding native codes during compilation, and the symbol information is stored in the .oat file, such as in the dynamic symbol section 180.

In an example, the compiler 151 collects symbol information for methods (functions) in the bytecodes. The symbol information for a method maps a method symbol in the bytecodes with offsets of corresponding native codes for the method. In another example, the compiler 151 collects symbol information for bytecodes. The symbol information for a bytecode maps the bytecode with offsets of corresponding native codes for the bytecode. In another example, the compiler 151 collects special symbol information for pre-defined special attributes. For example, a special symbol "$t" is pre-defined to indicate thumb-based instruction disassemble attribute, and a special symbol "$a" is pre-defined to indicate ARM-based instruction disassemble attribute. Thus, the special symbol information for a special symbol maps a special symbol for the special attribute to offsets of corresponding native codes for the special attribute. The detail compiling process is described with reference to FIG. 2.

In the FIG. 1 example, a memory space 140 is allocated to store code instructions for a profiling tool. In an example, the profiling tool is configured to obtain the sampled PC addresses by the profiling kernel module 125, and analyze the performance of the electronic device 100 based on the sampled PC addresses. The detail profiling process is described with reference to FIG. 3.

Figure 2:
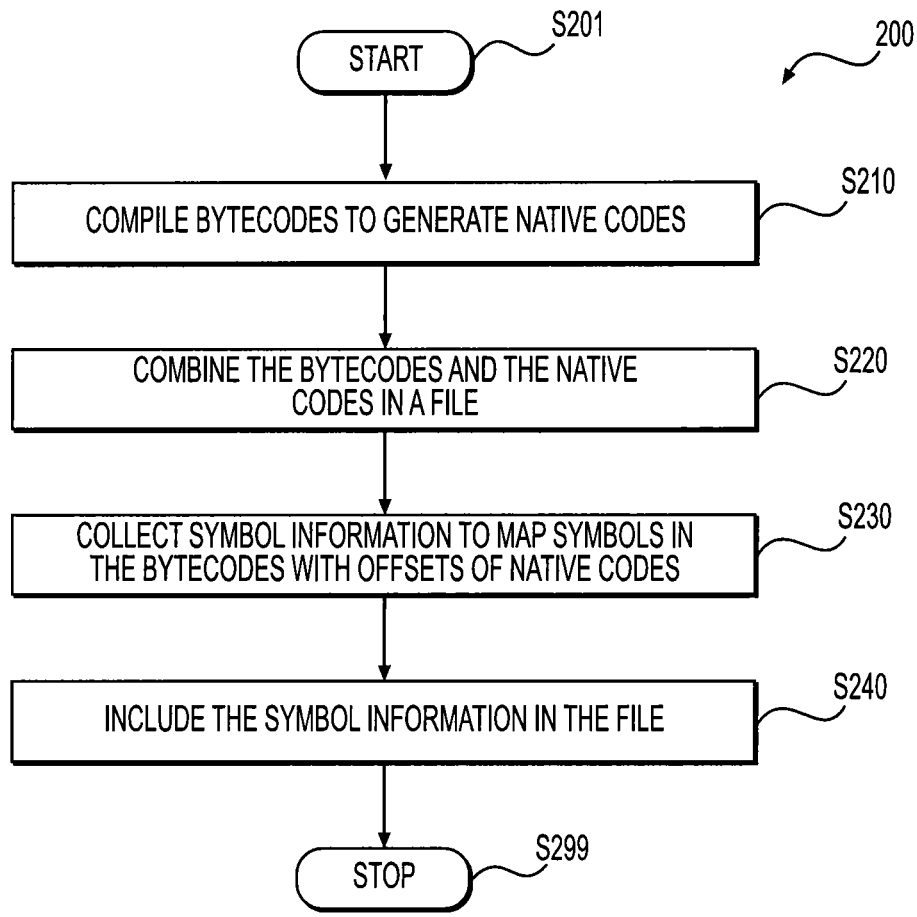
FIG. 2 shows a flow chart outlining a process 200 according to an embodiment of the disclosure.

FIG. 2 shows a flow chart outlining a process 200 according to an embodiment of the disclosure. In the FIG. 1 example, an application program in Java language is translated into Java bytecodes, and the Java bytecodes are stored at the memory space 160 in the memory module 110. The process 200 is executed in the electronic device 100 when the Java bytecodes are executed for the first time. The process starts at S201 and proceeds to S210.

At S210, bytecodes are compiled to generate native codes. In the FIG. 1 example, to execute the Java bytecodes for the first time, the processor 101 executes the Java runtime stored at the memory space 150 to start the ART Java virtual machine. The ART Java virtual machine provides Java runtime environment for executing the Java bytecodes. In the example, the compiler 151 compiles the Java bytecodes into native codes. In another example, the bytecodes are compiled to generate the native codes at an installation time of the application program. In another example, the bytecodes are compiled to generate the native codes at a first boot time of the electronic device 100.

At S220, the bytecodes and the native codes are combined in a file. In the FIG. 1 example, the compiler 151 generates the .oat file and the memory space 170 is allocated to store the .oat file. The .oat file includes the bytecodes in the rodata section 171 and includes the native codes in the text section 172.

At S230, symbol information to map symbols in the bytecodes with offsets of corresponding native codes are collected. In an example, the compiler 151 collects symbol information (e.g., symbol to offset mapping information), such as symbol information for methods in the bytecodes, symbol information for bytecodes, symbol information for special symbols and the like, and the offsets of the corresponding native codes during compilation.

At S240, the symbol information is included in the file. In the FIG. 1 example, the symbol information is included in the dynamic symbol section 180 of the .oat file. In an example, the symbol information is included in the dynamic symbol section 180 in the form of a dynamic symbol table. The .oat file is stored and the native codes in the .oat file can be suitably loaded and the can be executed by the processor 101 to execute the user application. The process proceeds to S299 and terminates.

In an example, to execute the native codes in the .oat file, a memory segment, such as the memory segment 130 is allocated, and the rodata section 171 is loaded into the memory segment 130 as the rodata section 131 with the first offset (OFFSET_1) to the START address, and the text section 172 is loaded into the memory segment 130 as the text section 132 with the second offset (OFFSET_1) to the START address. Thus, the methods in the bytecodes, and the bytecodes are loaded in the memory segment 130 with consistent offsets to the START address of the memory segment 130. The processor 101 then executes the native codes in the text section 132.

In the example, to execute the user application again, the native codes in the .oat file can be loaded again and executed by the processor 101. According to an aspect of the disclosure, each time to execute the user application, a different memory segment 130 can be allocated to load the codes, such as the rodata section 171 and the text section 172 and the like. Thus, the codes may be loaded into the different memory addresses each time. However, the offsets of memory addresses to the START address of the allocated memory segment 130 are sustained consistently for the executions. Thus, the mapping information of symbols to offsets can be used to identify symbols and assist profiling.

Figure 3:
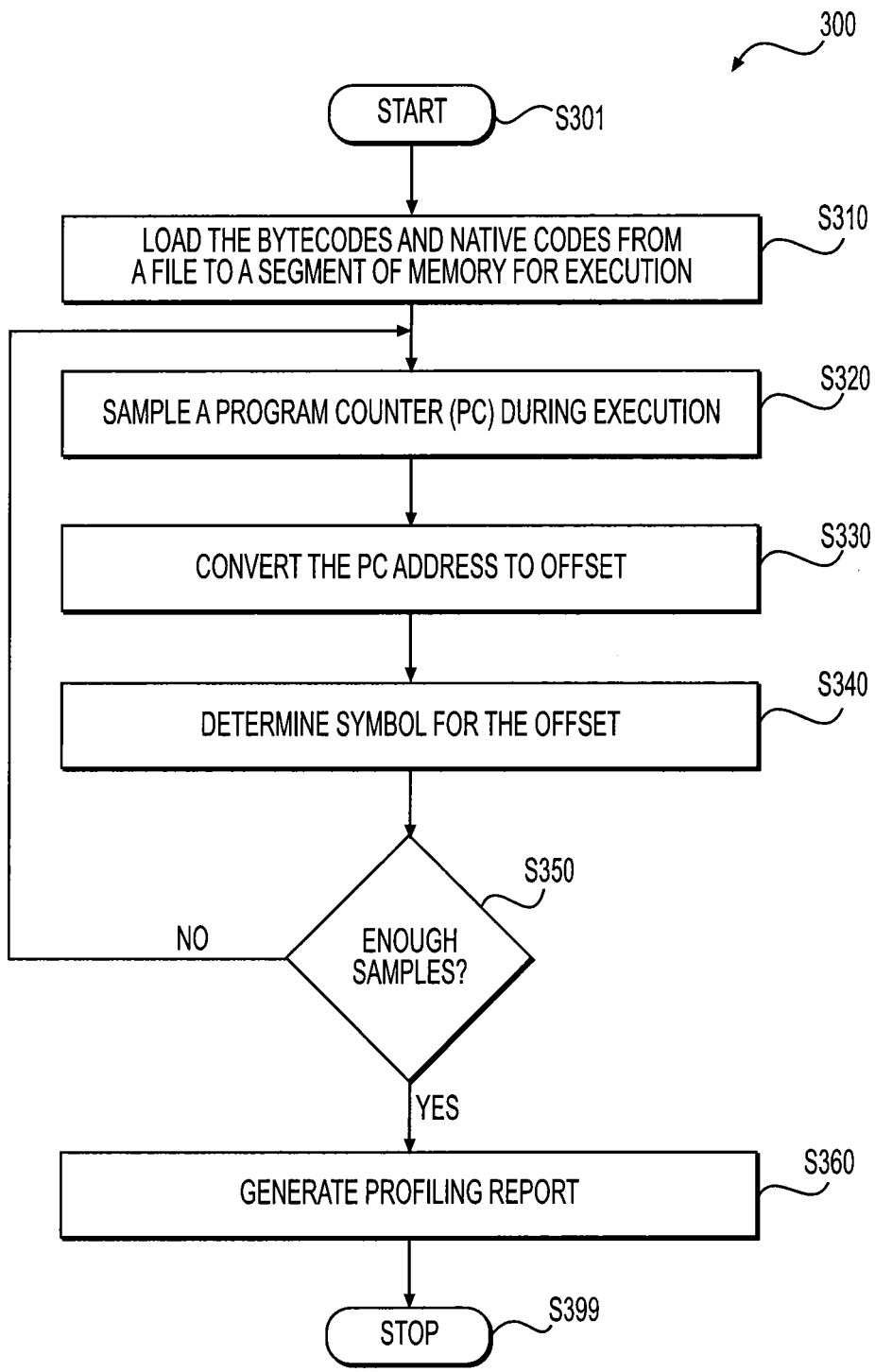
FIG. 3 shows a flow chart outlining a process 300 according to an embodiment of the disclosure.

FIG. 3 shows a flow chart outlining a profiling process 300 according to an embodiment of the disclosure. In an example, the profiling process 300 is executed when the processor 101 executes the profiling tool software stored at the memory space 140 to determine the performance of the electronic device 100 according to an application, such as a benchmark application. The profiling process 300 starts at S301 and proceeds to S310.

At S310, native codes for the application are loaded to a memory segment for execution. When the application is executed for the first time, the application is compiled according to the process 200 to generate .oat file to include symbol information to assist profiling. When the .oat file for the application exists, the native codes in the .oat file is loaded to the memory segment. In an example, to profile according to the user application at the memory space 160, a memory segment, such as the memory segment 130 is allocated to load the bytecodes and the native codes from the .oat file stored at the memory space 170. For example, the rodata section 171 is loaded into the memory segment 130 as the rodata section 131 with the first offset (OFFSET_1) to the START address, and the text section 172 is loaded into the memory segment 130 as the text section 132 with the second offset (OFFSET_1) to the START address. Then, the processor 101 executes the native codes in the text section 132.

At S320, a program counter (PC) is sampled periodically to obtain sampled PC addresses. In an example, the profiling tool periodically causes interrupts, and the profiling kernel module 125 obtains the address in the program counter as the PC address during interrupt routine.

At S330, the PC address is converted to the offset. In an example, the profiling tool calculates the offset according to Eq. 1 as a difference of the PC address to the START address of the memory segment 130.

At S340, the symbol corresponding to the offset is determined. In an example, the profiling tool determines the corresponding symbol for the offset based on the symbol mapping information in the dynamic symbol section 180.

At S350, when the profiling tool collects enough samples, the profiling process proceeds to S360; otherwise, the profiling process returns to S320 to further sample the PC register.

At S360, a profiling report is generated. The profiling tool generates a profiling report. The profiling report can include various information, such as a percentage of the total processor time for each method, a processor time for each bytecode, and the like. Then, the process proceeds to S399 and terminates.

It is noted that the profiling process can be suitably modified. In an example, the PC address is recorded in a memory space, and the step S330 and S340 can be executed offline after enough PC address samples has been collected.

Figure 4:
FIG. 4 shows a dynamic symbol table 400 according to an embodiment of the disclosure.

FIG. 4 shows a dynamic symbol table 400 according to an embodiment of the disclosure. In an example, symbol information is stored in the dynamic symbol section 180 in the format as the dynamic symbol table 400. The dynamic symbol table 400 stores information for symbols by rows, and includes eight columns 410-480 for each symbol. In a row for a symbol, the first column 410 stores an index for the symbol; the second column 420 stores an offset for the symbol; the third column 430 stores code size; the fourth column 440 stores a type for the symbol; the fifth column 450 stores symbol binding attribute; the sixth column 460; stores visibility information; the seventh column 470 stores a section index; and the eighth column 480 stores the name of the symbol.

The dynamic symbol table 400 can include dynamic link information for various symbols, such as section symbol, method symbol, bytecode symbol, special symbol and the like. In the FIG. 4 example, the row with the index 1 stores the symbol information of a section symbol "oatdata" which represents the rodata section. The row with the index 2 stores the symbol information for a section symbol "oatexec" which represents the text section. The row with the index 34 stores the symbol information for a method symbol "Linpack500.daxpy". The row with the index 176 stores the symbol information for a method symbol "Linpack500.dgefa". The row with the index 580 stores the symbol information for a method symbol "Linpack500.matgen". The row with the index 35 stores the symbol information for a bytecode symbol "[0x0] if—lez v10_0, 0x46 (+46)", the value in the second column 420 is the offset of the native codes corresponding to the bytecode, and in the bytecode symbol name, "[0x0]" is the offset of the bytecode and "if—lez v10_0, 0x46 (+46)" is the disassembly of the bytecode. The row with the index 36 stores the symbol information for a bytecode symbol "[0x2] const—wide/16 v1_1#0x0,#0", the value in the second column 420 is the offset of the native codes corresponding to the bytecode, and in the bytecode symbol name, "[0x2]" is the offset of the bytecode and "const—wide/16 v_1#0x0,#0" is the disassembly of the bytecode. The row with the index 47 stores the symbol information for a bytecode symbol "[0x14] neg—int v2_3, v10_0", the value in the second column 420 is the offset of the native codes corresponding to the bytecode, and in the bytecode symbol name, "[0x14]" is the offset of the bytecode, "neg—int v2_3, v10_0" is the disassembly of the bytecode.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   compiling bytecodes to generate native codes corresponding to the bytecodes in an electronic device;
   generating a file to include the bytecodes and the corresponding native codes in the file;
   collecting symbol information to map symbols in the bytecodes with offsets of corresponding native codes; and
   including the symbol information in the file that includes the bytecodes and the corresponding native codes and enables profiling by causing a profiling tool to interrupt periodically and obtain an address from a program counter and calculating an offset in a corresponding native code using the address and mapping the offset to symbols in the bytecodes.

2. The method of claim 1, further comprising:
   loading the bytecodes and the native codes from the file to a segment of a memory for execution;
   sampling a program counter (PC) to obtain a PC address during execution;
   converting the PC address to an offset to a starting address of the segment; and
   determining a symbol for the offset according to the symbol information.

3. The method of claim 1, wherein collecting the symbol information to map the symbols in the bytecodes with the offsets of the corresponding native codes further comprises:
   collecting method information to map methods in the bytecodes with offsets of corresponding native codes for the methods.

4. The method of claim 1, wherein collecting the symbol information to map the symbols in the bytecodes with the offsets of the corresponding native codes further comprises:
   collecting bytecodes information to map bytecodes with offsets of corresponding native codes for the bytecodes.

5. The method of claim 1, further comprising:
   including one or more symbols with pre-defined meanings in the symbol information.

6. The method of claim 1, wherein compiling the bytecodes to generate the native codes corresponding to the bytecodes further comprises at least one of:
   compiling the bytecodes, when the bytecodes are executed for a first time, to generate the native codes corresponding to the bytecodes;
   compiling the bytecodes of an application at an installation time of the application; and
   compiling the bytecodes at a boot time of the electronic device.

7. The method of claim 1, wherein including the symbol information in the file to enable profiling further comprising:
including the symbol information to map the symbols for the bytecodes with the offsets of the corresponding native codes in a symbol table of the file.

8. The method of claim 1, wherein compiling the bytecodes to generate the native codes corresponding to the bytecodes in the electronic device further comprises:
starting an Android runtime (ART) to compile the bytecodes to generate the native codes corresponding to the bytecodes.

9. The method of claim 1, wherein generating the file to include the bytecodes and the corresponding native codes in the file further comprises:
generating the file in an executable and linkable format to include the bytecodes and the corresponding native codes in the file.

10. The method of claim 1, wherein including the symbol information in the file to enable profiling further comprises:
including the symbol information in a dynamic symbol section for specifying dynamic linking information.

11. A non-transitory computer readable medium storing instructions for causing a processor to execute operations, the operations comprising:
compiling bytecodes to generate native codes corresponding to the bytecodes in an electronic device;
generating a file to include the bytecodes and the corresponding native codes in the file;
collecting symbol information to map symbols in the bytecodes with offsets of corresponding native codes; and
including the symbol information in the file that includes the bytecodes and the corresponding native codes and enables profiling by causing a profiling tool to interrupt periodically and obtain an address from a program counter and calculating an offset in a corresponding native code using the address and mapping the offset to symbols in the bytecodes.

12. The non-transitory computer readable medium of claim 11, the operations further comprising:
loading the bytecodes and the native codes from the file to a segment of a memory for execution;
sampling a program counter (PC) to obtain a PC address during execution;
converting the PC address to an offset to a starting address of the segment; and
determining a symbol for the offset according to the symbol information.

13. The non-transitory computer readable medium of claim 11, wherein collecting the symbol information to map the symbols in the bytecodes with the offsets of the corresponding native codes further comprises:
collecting method information to map methods in the bytecodes with offsets of corresponding native codes for the methods.

14. The non-transitory computer readable medium of claim 11, wherein collecting the symbol information to map the symbols in the bytecodes with the offsets of the corresponding native codes further comprises:
collecting bytecodes information to map bytecodes with offsets of corresponding native codes for the bytecodes.

15. The non-transitory computer readable medium of claim 11, the operations further comprising:
including one or more symbols with pre-defined meanings in the symbol information.

16. The non-transitory computer readable medium of claim 11, wherein compiling the bytecodes to generate the native codes corresponding to the bytecodes further comprises at least one of:
compiling the bytecodes, when the bytecodes are executed for a first time, to generate the native codes corresponding to the bytecodes;
compiling the bytecodes of an application at an installation time of the application; and
compiling the bytecodes at a boot time of the electronic device.

17. The non-transitory computer readable medium of claim 11, wherein the operations further comprises:
including the symbol information to map the symbols for the bytecodes with the offsets of the corresponding native codes in a symbol table of the file.

18. The non-transitory computer readable medium of claim 11, wherein compiling the bytecodes to generate the native codes corresponding to the bytecodes in the electronic device further comprises:
starting an Android runtime (ART) to compile the bytecodes to generate the native codes corresponding to the bytecodes.

19. The non-transitory computer readable medium of claim 11, wherein generating the file to include the bytecodes and the corresponding native codes in the file further comprises:
generating the file in an executable and linkable format to include the bytecodes and the corresponding native codes in the file.

20. The non-transitory computer readable medium of claim 11, wherein including the symbol information in the file to enable profiling further comprises:
including the symbol information in a dynamic symbol section for specifying dynamic linking information.

* * * * *